(12) United States Patent
Hanlon et al.

(10) Patent No.: US 7,832,613 B2
(45) Date of Patent: Nov. 16, 2010

(54) FRICTION STIR WELDING SYSTEM

(75) Inventors: Timothy Hanlon, Glenmont, NY (US);
Timothy Joseph Trapp, Wyoming, OH (US); Earl Claude Helder, Cincinnati, OH (US); Pazhayannur Ramanathan Subramanian, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/354,221

(22) Filed: Jan. 15, 2009

(65) Prior Publication Data

US 2010/0176182 A1    Jul. 15, 2010

(51) Int. Cl.
*B23K 20/12* (2006.01)
*B23K 37/04* (2006.01)
(52) U.S. Cl. .................................. 228/2.1; 228/112.1
(58) Field of Classification Search ............... 228/2.1, 228/112.1
See application file for complete search history.

(56) References Cited

U.S. PATENT DOCUMENTS

| 4,285,458 | A |   | 8/1981  | Slavens |   |
|---|---|---|---|---|---|
| 5,460,317 | A |   | 10/1995 | Thomas et al. |   |
| 5,611,479 | A |   | 3/1997  | Rosen |   |
| 5,769,306 | A |   | 6/1998  | Colligan |   |
| 5,971,247 | A | * | 10/1999 | Gentry | 228/2.1 |
| 6,237,835 | B1 | * | 5/2001  | Litwinski et al. | 228/112.1 |
| 6,732,901 | B2 |   | 5/2004  | Nelson et al. |   |
| 7,032,800 | B2 |   | 4/2006  | Subramanian et al. |   |
| 2004/0238599 | A1 |   | 12/2004 | Subramanian et al. |   |
| 2005/0006439 | A1 |   | 1/2005  | Packer et al. |   |
| 2005/0045694 | A1 | * | 3/2005  | Subramanian et al. | 228/112.1 |
| 2006/0249556 | A1 |   | 11/2006 | Subramanian et al. |   |
| 2008/0099533 | A1 |   | 5/2008  | Hanlon et al. |   |

FOREIGN PATENT DOCUMENTS

| EP | 151020 | 12/2004 |
|---|---|---|
| JP | 9253890 | 9/1997 |
| WO | WO02100586 | 12/2002 |

OTHER PUBLICATIONS

U.S. Appl. No. 11/554,751, filed Oct. 31, 2006, Applicant: Subramanian; Entitled: "Method for Controlling Microstructure via Thermally Managed Solid State Joining".
European Search Report dated May 20, 2010.

\* cited by examiner

*Primary Examiner*—Jessica L Ward
*Assistant Examiner*—Devang R Patel
(74) *Attorney, Agent, or Firm*—Richard A. DeCristofaro

(57) ABSTRACT

A system, in certain embodiments, includes a backing plate, a tungsten-based member disposed along the backing plate, wherein the tungsten-based member defines a welding work surface, and the tungsten-based member comprises curved grooves configured to secure the tungsten-based member to the backing plate. The system also includes a drive. The system includes a pin tool movable by the drive to create friction along one or more workpieces disposed on the welding work surface, wherein the frictional heating and mechanical stirring is configured to create a stir weld along the one or more workpieces. The system, in some embodiments, also may include a backing plate comprising liquid passages and gas passages and a tungsten-based member disposed along the backing plate, wherein the tungsten-based member defines a welding work surface.

21 Claims, 6 Drawing Sheets

FRICTION STIR WELDING SYSTEM

BACKGROUND

The invention relates generally to solid state welding technology, and more particularly to friction stir welding.

Increasing the output and efficiency of turbo-machinery such as gas turbine engines requires optimization of materials that balance high temperature strength, creep and fatigue resistance, oxidation and corrosion resistance, as well as structural stability, among others. In many cases, the alloying content requirements of these materials have dictated a powder processing approach to prevent material segregation. When joining these, as well as many conventionally cast materials, it is often advantageous to remain below the melting temperature, thereby eliminating issues commonly observed in traditional fusion welding processes, such as solidification induced cracking and porosity, weld zone material segregation, and the formation of a rapidly solidified cast microstructure.

Solid state welding or joining processes have been developed as a way of addressing these issues. One of the more successfully employed techniques is friction stir welding, which can be used to join similar or dissimilar metals and alloys, thermoplastics, or other materials. The solid-state nature of this technique addresses the above mentioned issues associated with other more conventional joining techniques, enabling the joining of materials otherwise considered difficult or impossible to weld.

In a typical friction stir welding system, a rotating, often cylindrical, consumable or non-consumable pin tool may be plunged into a rigidly clamped workpiece at a location containing a linear or non-linear joint to be welded. Frictional heating locally plasticizes the workpiece, enabling material transfer across the joint interface through a forging and/or extrusion action about the rotating pin tool. Ideally, workpiece temperatures remain below the melting temperature of the material throughout the duration of the weld. In many material systems, precise through-thickness control of in-situ weld metal heating and cooling rates is also critical to the quality of the weld. Improved control over in-situ pin tool and workpiece temperatures can also prevent bonding between the workpiece and the backplate, undesirable workpiece material structure, and destruction of the backplate components.

BRIEF DESCRIPTION

A system, in certain embodiments, includes a backing plate, a tungsten-based member disposed along the backing plate, wherein the tungsten-based member defines a welding work surface, and the tungsten-based member comprises curved grooves configured to secure the tungsten-based member to the backing plate. Alternate suitably high strength/high temperature materials can be substituted as the welding work surface, in place of the tungsten based member. The system also includes a drive. The system also includes a pin tool movable by the drive to create friction along one or more workpieces disposed on the welding work surface, wherein the friction is configured to create a stir weld along the one or more workpieces. The system, in some embodiments, also may include a backing plate comprising liquid passages and gas passages and a tungsten-based member disposed along the backing plate, wherein the tungsten-based member defines a welding work surface. Alternate suitably high strength/high temperature materials can be substituted as the welding work surface, in place of the tungsten based member.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
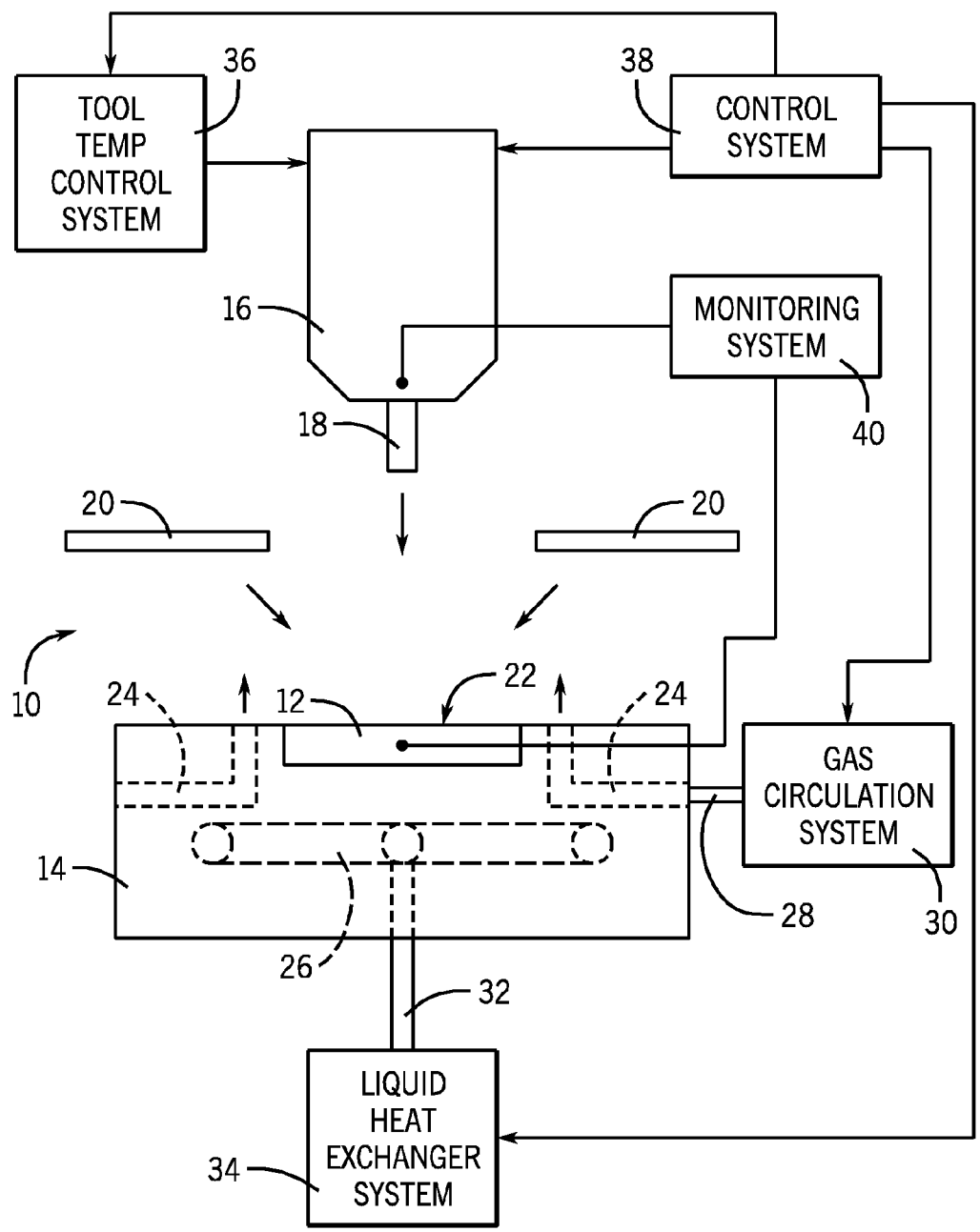
FIG. 1 is a block diagram of an embodiment of a friction stir welding system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed in detail below, various configurations of friction stir welding systems may be employed to manage the temperature of the workpieces, welding pin tool, and backing plates. An example of the workpiece material to be welded is a titanium alloy, e.g., for use in aerospace applications. The temperature of such workpieces may exceed 1800 degrees Fahrenheit during a stir welding process. In addition, the backing plate and workpiece surface may be subjected to 10,000 to 20,000 pounds of force during the process. Further, the systems below may be applicable to joining workpieces using adiabatic heating in addition to stir welding. As discussed below, such forces and temperatures may cause deformities in the backing plates and cause the workpieces to bond to the backing plate. In an embodiment, a member made of material that is harder than surrounding materials in the backing plate may be utilized to control the temperature of workpieces. Specifically, the embodiments discussed below may employ a tungsten-based member located on the backing plate along the weld axis to withstand the high thermal and mechanical loads that occur along the weld joint. The tungsten-based member may be placed in a cavity of the backing plate and may be generally flush with the working surface of the backing plate. The member, made of tungsten, or another suitable thermally conductive material, may have cooling lines beneath it for flowing gas and/or liquid to control the temperature of the workpiece. Further, the stir welding system may include channels in the backing plate or in other portions of the system to cool or heat system components, thereby managing the temperature of the pin tool and workpieces to produce an overall better weld. The channels may utilize liquid and/or gas to manage the temperature of the system and workpieces.

In another embodiment, a plurality of tungsten-based members may be placed end to end along the weld axis. A sacrificial tungsten-based member may be placed below the portion of the joint where the pin tool is plunged into the workpieces. This initial contact tungsten-based member is exposed to extreme temperatures and stresses, relative to the rest of the weld axis, and therefore may be replaced more frequently than tungsten-based members located along the remaining portion of the weld axis. As described herein, the weld axis is the line along which the joint between two workpieces is located. Moreover, additional tungsten-based members may also be located at the end of a first "main section" tungsten-based member, to allow for longer stir weld joints. By implementing these embodiments, workpiece heating rates, in situ workpiece temperature profile, and high post-weld workpiece cooling rates may be managed to result in a weld joint of improved utility to the overall weld application design. Further, the techniques may reduce or eliminate bonding between the workpiece and the backplate, undesirable workpiece material structure, and destruction of the backplate components.

FIG. 1 is a block diagram illustrating an embodiment of friction stir welding system 10. In the embodiment, tungsten-based member 12 is coupled to backing plate 14. As depicted, drive unit 16 powers the movement of pin tool 18. In an embodiment, the pin tool 18 may be rotated at speeds between about 50 RPM and about 2000 RPM during the stir welding process to create a stir weld joint between workpieces 20. As discussed in detail below, tungsten-based member 12 may be mounted directly below a desired weld joint location, thereby providing greater resistance to heat, wear, and stresses associated with friction stir welding. Tungsten-based member 12 may include a doped or undoped tungsten, which may or may not be alloyed with alternate elements. The dopant material may include at least one material of lithium, sodium, potassium, rubidium, cesium, lanthanum oxide, yttrium oxide, cerium oxide, or thorium oxide. For example, member 12 may comprise doped or undoped, alloyed or unalloyed tungsten that includes a dopant material and/or alloyed or unalloyed tungsten. An example of one such tungsten-based member may be found in U.S. Pat. No. 7,337,940, filed on Apr. 24, 2006, which is herein incorporated by reference in its entirety for all purposes. In addition, U.S. patent application Ser. No. 11/554,751 is herein incorporated by reference in its entirety for all purposes. In another embodiment, an alternate suitably high temperature/high strength material can be used in place of the tungsten-based member 12. Some examples of materials that may be used in place of the tungsten material may include Mar-M247, IN100, ALLVAC 718PLUS, and for lower temperature applications, tool steels and stainless steels.

In addition, the high strength material may be about 10%-50% stronger than the material that surrounds member 12.

As depicted, the rotating pin tool 18 may be plunged into clamped workpieces 20 at a location containing a joint to be welded. The workpieces 20 may be clamped into place on the steel backing plate 14 during welding. The rotating pin tool 18 can be traversed along the joint to be welded, held in place as the workpieces 20 are fed past the tool 18, or any combination of the two. As the weld progresses, the workpiece material within the joint vicinity becomes a plasticized (non-liquid) metal, metal alloy or other material. As the tool 18 works across the joint, workpiece material from the joint transfers across the joint interface, co-mingling to form a strong cohesive bond between the workpiece components through a localized solid-state forging and/or extrusion action.

In the embodiment, workpiece surface 22 is generally flat so as to ensure an optimal surface between tungsten-based member 12 and workpieces 20. The flat workpiece surface 22 is configured to optimize temperature distribution between various components of the stir welding system 10 and workpieces 20. The temperature of workpieces 20 may be managed in part by gas channels 24 located inside backing plate 14. Gas channels 24 may be used to circulate a gas, inert or otherwise, such as argon, to assist in cooling and/or heating workpieces 20, tungsten-based member 12 and/or backing plate 14. As appreciated, gas channels 24 may also provide inert gas shielding specifically but not limited to the underside of the workpiece during the stir welding process, thereby substantially reducing oxidation and degradation of the welding joint. In the embodiment, backing plate 14 also includes liquid channels 26, which may be used to cool and/or heat the backing plate 14, tungsten-based member 12, and/or workpieces 20. Gas channels 24 are connected by gas lines 28 to gas circulation system 30, which may be used to control the flow rate and the temperature of a gas circulating through backing plate 14. Liquid channels 26 are connected via lines 32 to liquid heat exchanger system 34, which may be used to regulate the flow rate and the temperatures of backing plate 14, tungsten-based member 12 and/or workpieces 20. In other embodiments, either liquid channels 26 or gas channels 24 may be used alone to manage the temperature of stir welding system 10. Further, the configuration, size, geometry, and location of liquid channels 26 and/or gas channels 24 may be altered to optimize thermal performance, simplify manufacturing, or meet other application requirements.

In the embodiment, the tool temperature control system 36 is coupled to pin tool drive unit 16 in order to monitor and regulate the temperature of pin tool 18. Temperature control system 36 may use gas, liquid, or other suitable heat exchange/transfer elements to control the temperature of pin tool 18 as it creates a stir weld joint. Welding control system 38 may be used to monitor the movement and speed of pin tool 18, tool temperature control system 36, gas circulation system 30, and liquid heat exchanger system 34. Welding control system 38 may include one or more computers that may be used to perform an algorithm or other software programs to coordinate and regulate the operation and temperature of friction stir welding system 10 and its components. Further, monitoring system 40 may be connected to control system 38, thereby enabling temperature monitoring of various components of friction stir welding system 10. As depicted, monitoring system 40 has sensors, such as thermocouples, located in pin tool drive 16 and tungsten-based member 12.

In a particular embodiment, the liquid channels 26 and gas channels 24 may be used to pre-heat, heat, and/or post-weld heat a weld affected region. The heat may be used to decrease stress on the workpieces 20 and/or control the post-weld cooling rate within the weld affected region, and thus provide a desired microstructure or provide other benefits such as improved tool performance, and optimized weld properties. In an alternative embodiment, heating may also be provided by multiple resistive heaters. Other examples of heating methods may include passing a fluid as a temperature control media, microwave heating, laser heating, ultrasonic heating and induction heating. Using a fluid, such as a gas or liquid, to control the weld affected region enables a low maintenance and effective method for temperature control. For example, an external tank may store and cool a liquid, that features desirable thermodynamic properties, which may be circulated to control a temperature of components within friction stir welding system 10. In another embodiment, the liquid channels 26 and gas channels 24 may be used to cool the weld affected zone in order to extract heat from the weld. Water or any suitable cooling fluid or gas may flow through the liquid channels 26 and gas channels 24 of the backing plate 14.

As shown in the FIG. 1, workpieces 20 are located above flat workpiece surface 22 prior to positioning for the stir welding process. In the embodiment, workpieces 20 may be composed of similar or dissimilar suitably high strength materials such as Ti-base, Ni-base, and Fe-base alloys, or other high performance material compositions, such as those that may be used for components of turbine engines. As previously discussed, stir welding of high strength materials may lead to degradation of certain properties in the materials, which may be avoided or reduced by managing the temperature of workpieces 20 and certain components of friction stir welding system 10 using the embodiments discussed herein. Therefore, many configurations of friction stir welding system 10 may be envisioned, featuring inert gases, liquids, and/or other suitable techniques for heating or cooling, controlled by a computer or other suitable devices.

Figure 2:
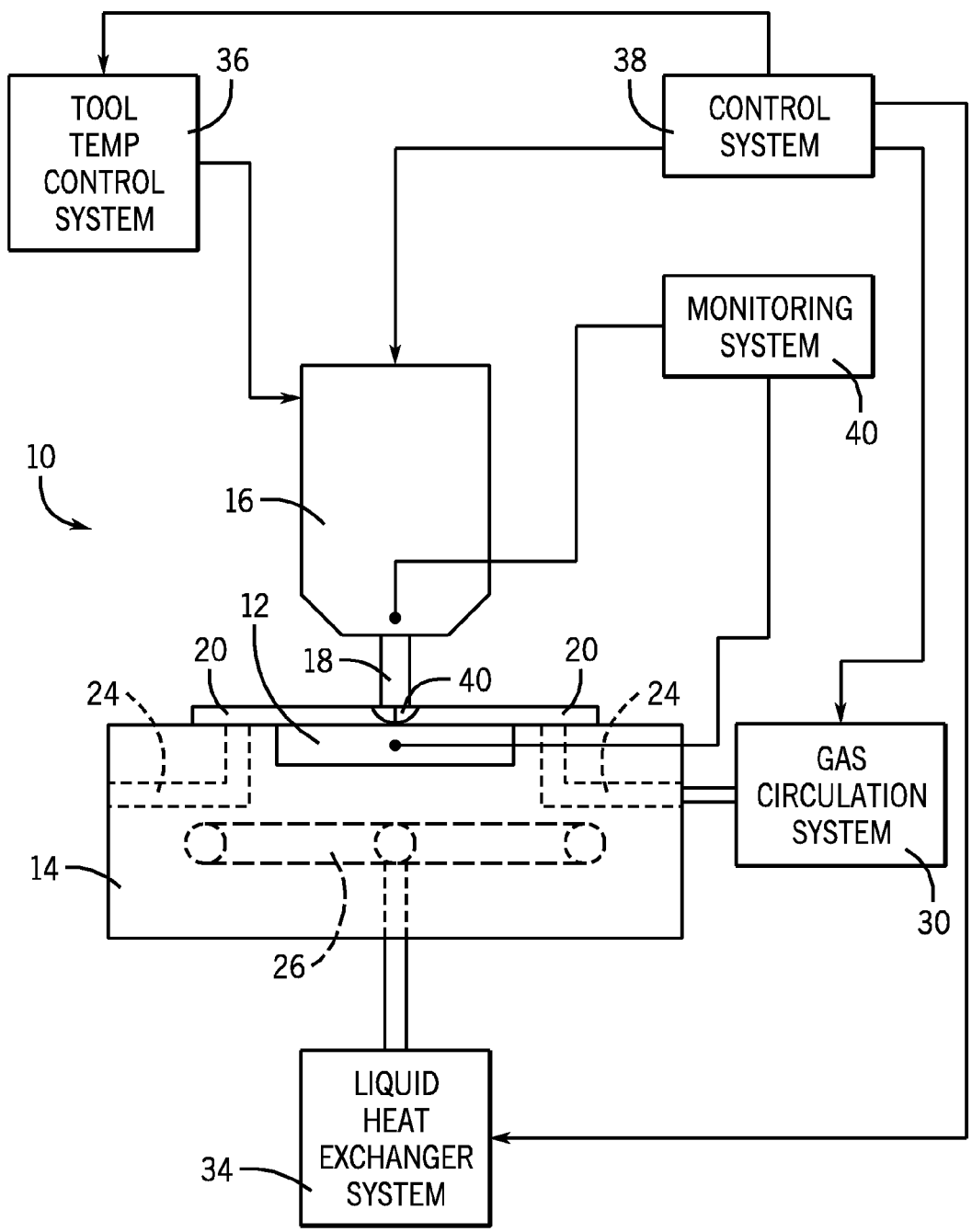
FIG. 2 is a block diagram of an embodiment of a friction stir welding system, wherein a pin tool is engaging workpieces.

FIG. 2 is a diagrammatic illustration of an embodiment of friction stir welding system 10, wherein workpieces 20 and pin tool 18 are positioned to perform a stir weld. In the embodiment, workpieces 20 are placed together near the middle of tungsten-based member 12 and directly beneath pin tool 18. As depicted, an operator may configure the control system 38 to have the drive unit 16 and pin tool 18 moved downward, thereby plunging pin tool 18 into weld joint 40 as pin tool 18 rotates at the desired speed. As appreciated, the rotation of pin tool 18 directly against workpieces 20 creates significant friction and heat, thereby enabling a solid state bond to form as indicated by weld joint 40 between the two workpieces 20. In the embodiment, the temperature of workpieces 20, pin tool 18, tungsten-based member 12 and other components may be monitored and regulated, thereby ensuring that the structural irregularities and degradation of workpieces 20 are minimized. In particular, the composition of tungsten-based member 12 and its location along the weld axis, beneath weld joint 40, help increase the overall quality of the stir weld. In an embodiment, the materials chosen for pin tool 18 and tungsten-based member 12 may be the same and are particularly useful in maintaining and controlling the temperature of workpieces 20 during the stir weld process.

Figure 3:
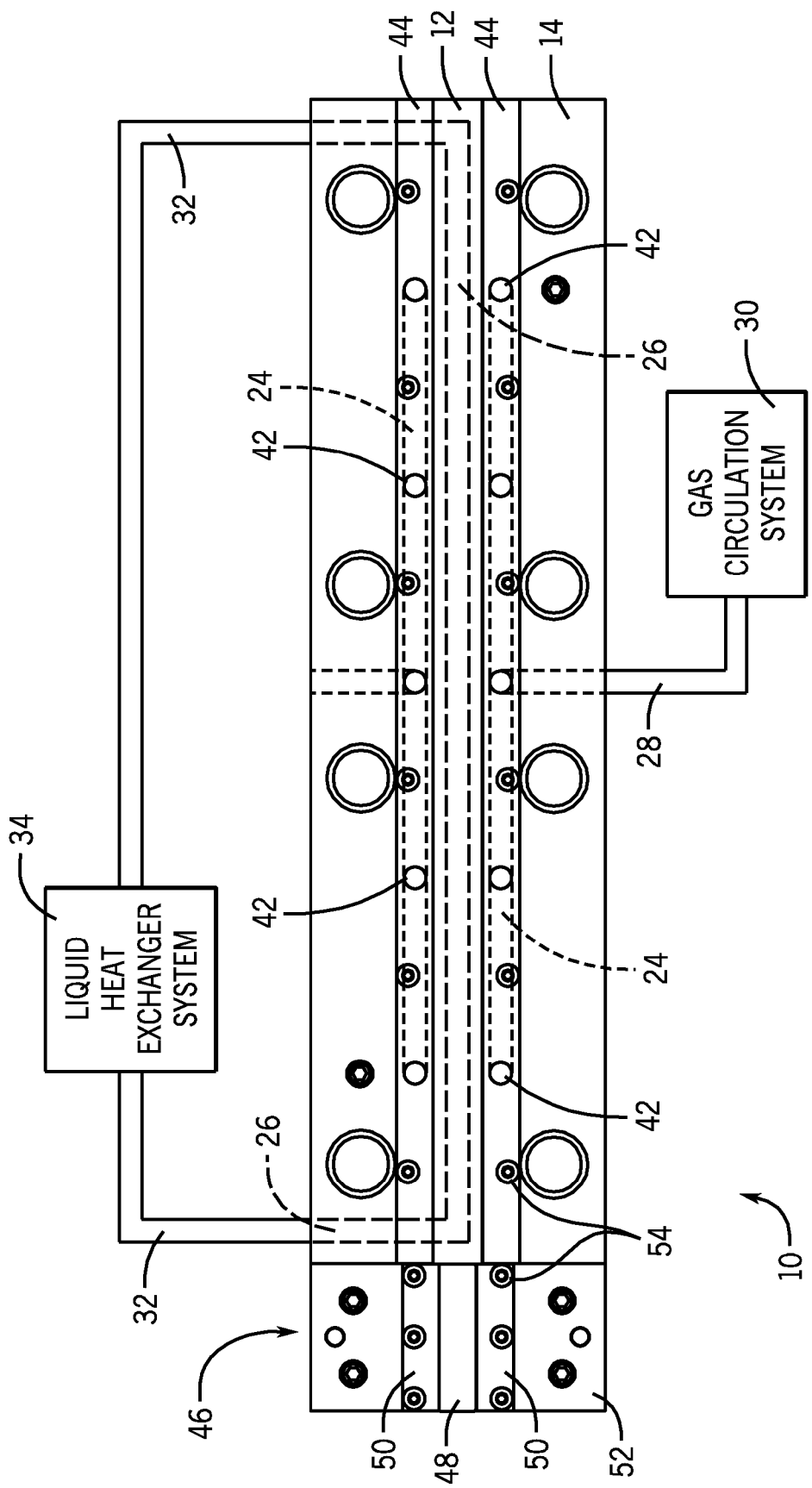
FIG. 3 is a partial top view of an embodiment of a friction stir welding system as shown in FIGS. 1 and 2.

FIG. 3 is an illustration of a top view of an embodiment of friction stir welding system 10 featuring gas channels 24 and liquid channels 26. In the embodiment, gas channels 24 are connected to gas circulation system 30 via gas line 28. Gas channels 24 circulate a gas, inert or otherwise, through backing plate 14 and release the heated or cooled gas through gas outlets holes 42, which may be located in the top surface of strips 44. In the embodiment, gas outlet holes 42 are distributed throughout stir welding system 10 to control the temperature of the components and the workpieces. Gas released from gas outlet holes 42 may also be used to shield the weld joint during the weld process, thereby protecting the joint from impurities and/or oxidation. In the embodiment, strips 44 are used to secure tungsten-based member 12 in place, thereby ensuring that tungsten-based member 12 is not moved by forces exerted during the stir welding process. Strips 44 may be made of a steel alloy or other suitable material that is able to hold down tungsten-based member 12 while possessing the desired weight and thermal properties.

In the embodiment, gas channels 24 are located beneath strips 44 and backing plate 14. Gas outlet holes 42 may be located in any suitable location in the stir welding system 10 to achieve the desired thermal control and shielding that may be utilized by the stir welding system 10. As depicted, liquid exchanger system 34 is connected via lines 32 to liquid channels 26, which may be located in any suitable location in the backing plate 14 or in other components of the friction stir welding system 10. Liquid channels 26 run underneath tungsten-based member 12 to maximize the effect of the liquid temperature control on the workpieces.

As shown, initial contact section 46 is located at one end of backing plate 14. Initial contact section 46 may be located underneath the section of the workpiece where the pin tool drive unit 16 may be initially plunged into the workpiece joint. The pin tool 18 may then move down the joint, along the weld axis, with reduced pressures and force on the tungsten-based member and other components located in main section 47. In certain embodiments, the process of plunging the pin tool into the workpiece creates significant forces and wear and tear on the components located at the point of initial contact with the workpieces. The components included in the initial contact section 46 may be subject to more extreme forces, wear and tear, which may result in more frequent maintenance and/or replacement than the components located in main section 47. Also included in initial contact section 46 are tungsten-based member 48, strips 50 and backing plate 52. In the figure, strips 44 and 50 may be held down by screws 54 which may be screwed to countersunk holes in the strips, thereby ensuring an optimal flat surface for the workpieces.

The components of initial contact section 46 may be composed of similar materials to the components of main section 47 or may be composed of alternate, potentially less expensive materials, due to the fact that initial contact section 46 may be replaced more frequently. For example, after performing five to ten stir weld processes, tungsten-based member 48 and strips 50 may be deformed or their working surface may not be as smooth as that of components of main section 47. Moreover, the deformed portions of initial contact section 46 may cause degradation of the materials of the workpieces 20 and weld joint 40. Therefore, it may be desirable to replace initial contact section 46 or its components after five to ten uses to ensure high quality stir welds. Further, main section 47 components may not experience the extreme forces that initial contact section 46 is subjected to, thereby preserving the integrity the components of main section 47. For example, main section 47 may utilize the same components without maintenance or replacement for 300 to 500 or more stir welding operations.

Figure 4:
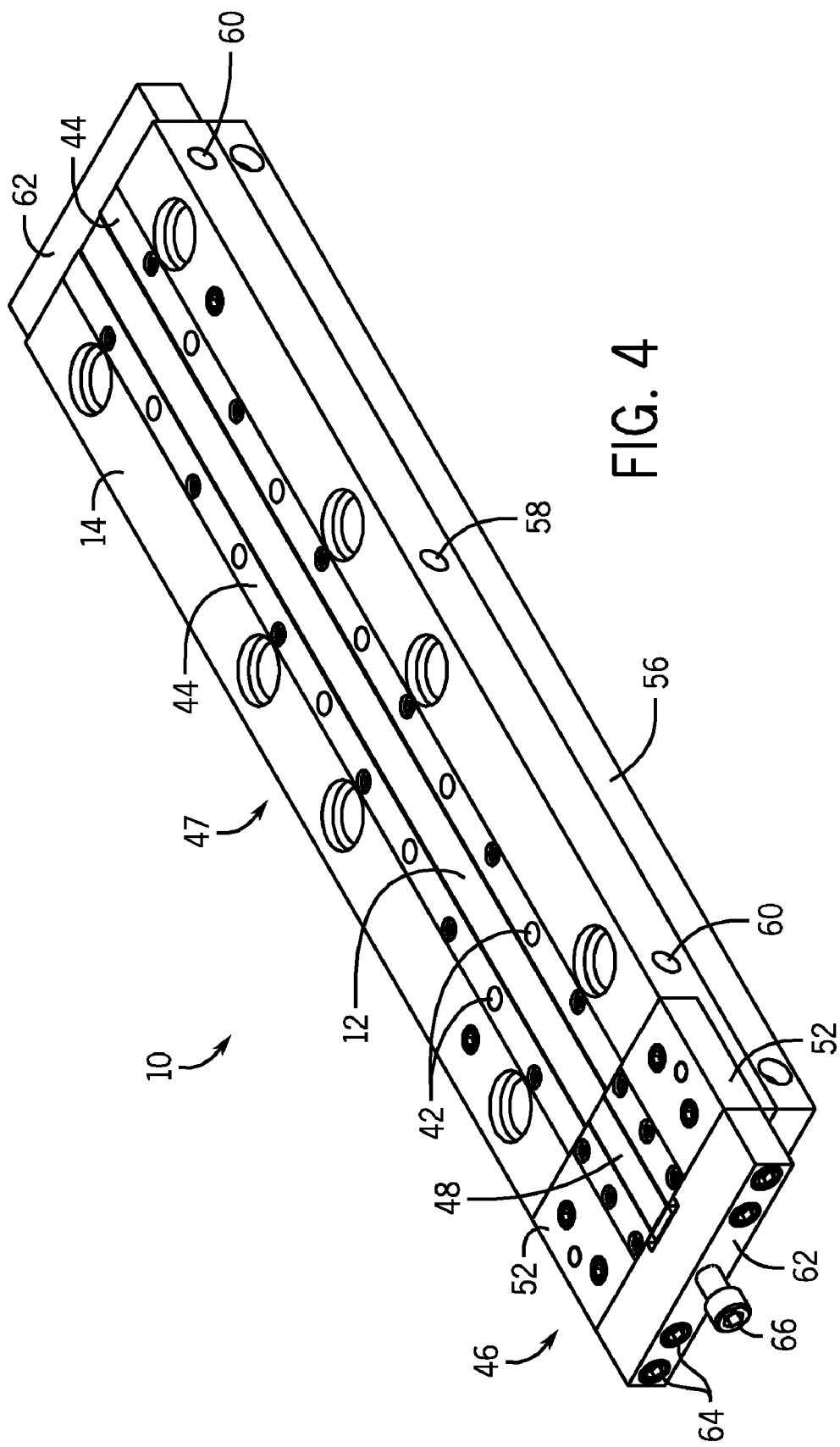
FIG. 4 is a partial top perspective view of an embodiment of a friction stir welding system as shown in FIGS. 1 and 2, with certain components removed to enhance clarity.

FIG. 4 is a perspective view of an embodiment of friction stir welding system 10. In the diagram, initial contact section 46 is located at one end of the friction stir welding system 10 adjacent to main section 47. Tungsten-based member 48 is located in initial contact section 46 and abuts an end of tungsten-based member 12. In the embodiment, gas outlet holes 42 are located axially along strips 44, which are located on either side of tungsten-based member 12. Further, backing plate 14 may be mounted on another member, such as base 56, which may be composed of any suitable material such as a steel alloy. In an embodiment, base 56 may also include liquid and/or gas channels to route cooling and heating materials to the working surface of backing plate 14. As depicted, backing plate 14 includes gas inlet hole 58 as well as liquid flow holes 60, which may be located on the side of backing plate 14. The components of initial contact section 46 and the components of main section 47 are held in place by end sections 62. End section 62 may be coupled to backing plate 52 and backing plate 14 by screws 64. In the embodiment, tungsten-based member 48 may also be held in place by screw adjustment 66. As shown, the used of certain materials, such as tungsten-based members 12 and 48, as well as gas and liquid temperature control channels will enable temperature management of workpieces 20 and will produce an optimal workpiece surface for stir welding.

Figure 5:
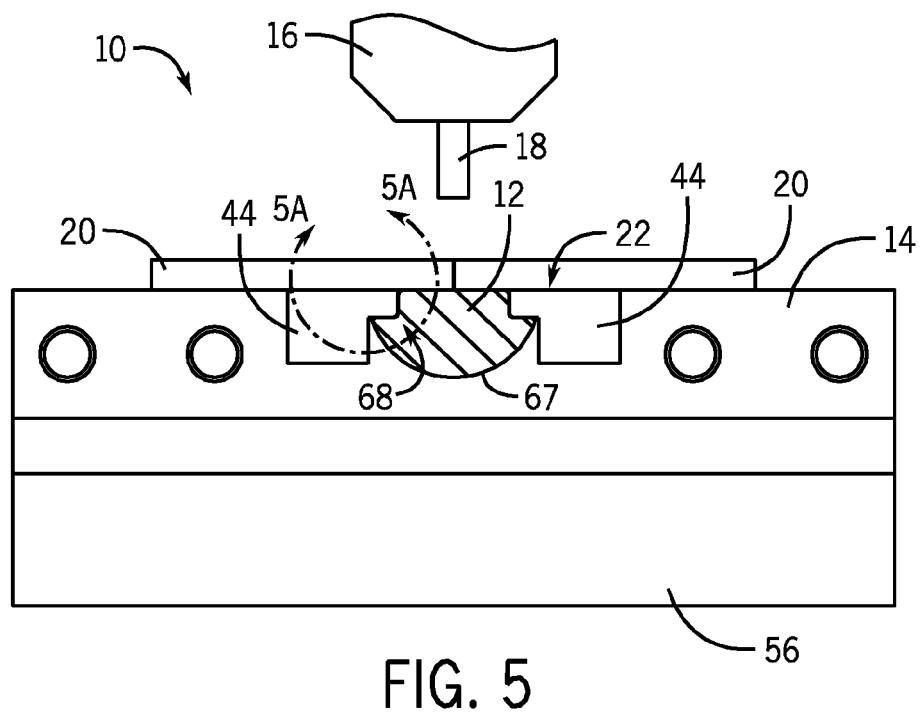
FIG. 5 is a partial end view of an embodiment of a friction stir welding system as shown in FIGS. 1 and 2.
Figure 5A:
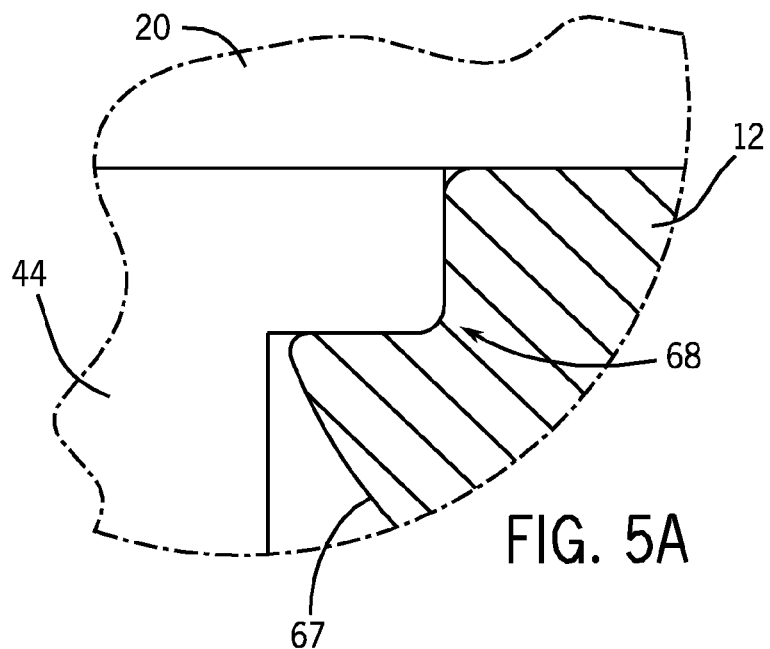
FIG. 5A is a detailed view of curved grooves of a tungsten-based member, as shown in FIG. 5.

FIG. 5 shows an end-view of an embodiment of friction stir welding system 10. The embodiment includes pin tool drive unit 16, pin tool 18, workpieces 20, and other components of the stir welding system. In the embodiment, workpieces 20 are placed on generally flat workpiece surface 22, which creates an optimal surface for heat transfer and force distribution during the stir welding process. In the illustration, a cross-section of tungsten-based member 12 and strips 44 is shown. Tungsten-based member 12 is recessed in the cavity of backing plate 14, and is captured between strips 44 and the backing plate 14. In other words, strips 44 may be used to secure tungsten-based member 12 into place within the recess. In the exemplary embodiment, the tungsten based member 12 has a flat top surface 22, an arcuate bottom surface 67 (e.g., semi-cylindrical), and a pair of grooves 68 recessed along opposite sides of the flat top surface 22. The arcuate bottom surface 67 may improve centering, improve force distribution, and reduce stresses associated with friction stir welding. The illustrated grooves 68 also may have a curved geometry to optimize force distribution during the stir welding process. For example, the corner of strips 44 that interface the grooves 68 of tungsten-based member 12 may be rounded so as to reduce the possibility of structural degradation or movement of the tungsten-based member during the stir welding process. An embodiment of tungsten-based member 12 may include curved grooves, featuring the curved or rounded corners as illustrated in the diagram, wherein the strips 44 secure the tungsten-based member in place against the backing plate 14. The arrangement of strips 44 and tungsten-based member 12 produces a generally flat workpiece surface 22, which provides improved heat distribution and management during the stir welding process. FIG. 5A is a detailed view of the curved grooves 68 of tungsten-based member 12, as shown in FIG. 5.

Figure 6:
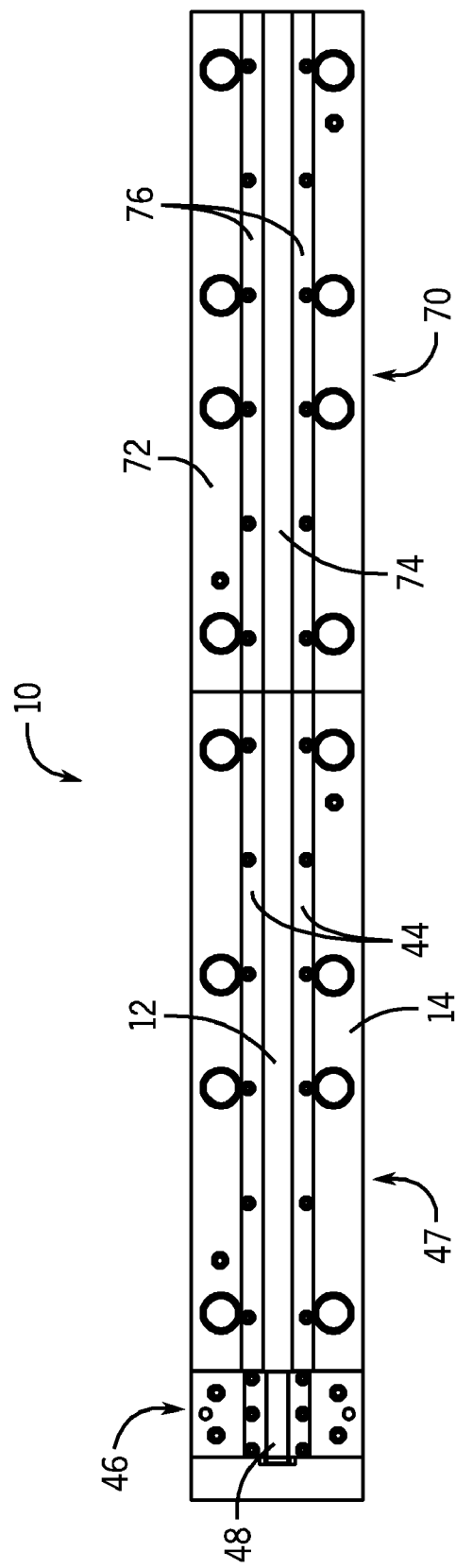
FIG. 6 is a partial top view of another embodiment of a friction stir welding system.

FIG. 6 is an illustration of another embodiment of friction stir welding system 10, including initial contact section 46, main section 47 and modular section 70. In the embodiment, modular section 70 may be placed at an end of main section 47, thereby enabling a longer stir weld joint than allowed by previous embodiments. As depicted, modular section 70 includes backing plate 72, tungsten-based member 74, and strips 76. In the embodiment, the components of modular section 70 may be made of the same materials as main section 47, or may be duplicates of the components of main section 47. For example, tungsten-based member 74 may be made of the same material as tungsten-based members 12 and 48. Similarly, strips 50, 44, and 76 may be composed of a steel alloy. During an exemplary stir welding operation, the pin tool 18 may be plunged into a workpiece 20 while the pin tool is located above tungsten-based member 48. After becoming fully plunged into the workpiece 20, the pin tool 18 may be moved along tungsten-based member 12, across the weld axis, and may continue over tungsten-based member 74 of modular section 70 in the present embodiment. The illustrated arrangement enables longer stir welds than may be allowed in other embodiments of the stir welding system 10. In some embodiments, stir welding system 10 may also feature liquid and/or gas temperature control channels in initial contact section 46, main section 47, and modular section 70 in order to manipulate the temperature of system components and workpieces. In other embodiments, multiple modular sections 70 can be employed to extend the weld length indefinitely.

It should be understood that the temperature management techniques, materials used, and system configurations described above may be used in friction stir welding systems of different configurations as well. For example, the tungsten-based members may be used as "shoulders," located on the inside corners of backing plates of a T-joint stir welding system. Further, such a system may employ gas and/or liquid to manage the temperature of the workpieces and system components. In yet another example, the workpiece surface 22 may be curvilinear to accommodate non-linear and/or contoured joints.

The various embodiments of a system for controlling microstructure and properties of workpiece materials via temperature management described above illustrates a way to improve or preserve material properties including but not limited to yield strength, tensile strength, ductility, impact toughness, fracture toughness, fatigue crack growth resistance, low cycle fatigue resistance, high cycle fatigue resistance, and superplastic formability of a friction weld and surrounding regions.

While only certain features of the invention have been illustrated and described herein, many modifications and changes will occur to those skilled in the art. It is, therefore, to be understood that the appended claims are intended to cover all such modifications and changes that fall within the true spirit of the invention.

The invention claimed is:

1. A stir welding system, comprising:
    a backing plate, comprising a cavity;
    a tungsten-based member disposed along the backing plate and received by the cavity, wherein the tungsten-based member defines a welding work surface and the tungsten-based member comprises curved grooves configured to secure the tungsten-based member to the backing plate, such that the member and backing plate define generally flush welding work surface including both the backing plate and the member;
    a drive; and
    a pin tool movable by the drive to create friction along one or more workpieces disposed on the welding work surface, wherein the frictional heating and mechanical stirring is configured to create a stir weld along the one or more workpieces.

2. The stir welding system of claim 1, wherein the tungsten-based member comprises an arcuate surface opposite from the welding work surface, wherein the welding work surface is generally flat and wherein the curved grooves are recessed in the welding work surface.

3. The stir welding system of claim 1, comprising strips configured to fit in the curved grooves while securing the tungsten-based member to the backing plate and wherein the strips are generally flush with the welding work surface.

4. The stir welding system of claim 1, wherein the backing plate comprises liquid passages configured to cool or heat the tungsten-based member and one or more workpieces.

5. The stir welding system of claim 1, wherein the backing plate comprises gas passages configured to cool or heat the tungsten-based member and one or more workpieces.

6. The stir welding system of claim 5, wherein the gas passages are configured to flow a shielding gas.

7. The stir welding system of claim 1, wherein the tungsten-based member comprises a plurality of sections disposed one after another along a direction of the stir weld.

8. The stir welding system of claim 7, wherein the plurality of sections comprises an initial pin tool contact section and a stir welding section.

9. The stir welding system of claim 1, wherein the tungsten-based member comprises tungsten that includes a dopant material, wherein the dopant material comprises lithium, sodium, potassium, rubidium, cesium, lanthanum oxide, yttrium oxide, cerium oxide, thorium oxide, or a combination thereof.

10. A stir welding system, comprising:
a backing plate, comprising a cavity;
a tungsten-based member disposed along the backing plate and received by the cavity to define a generally flush welding work surface including both the backing plate and the member, and the tungsten-based member comprises curved grooves configured to secure the member to the backing plate and the member further comprises a plurality of sections positioned one after another along a direction of a stir weld.

11. The stir welding system of claim 10, wherein the backing plate comprises liquid passages configured to cool or heat the tungsten-based member and one or more workpieces.

12. The stir welding system of claim 10, wherein the backing plate comprises gas passages configured to cool or heat the tungsten-based member and one or more workpieces.

13. The stir welding system of claim 12, wherein the gas passages are configured to flow a shielding gas.

14. The stir welding system of claim 10, wherein the plurality of sections comprises an initial pin tool contact section and a stir welding section.

15. The stir welding system of claim 10, wherein the plurality of sections and the cavity are configured to adjoin each other at an end of each section.

16. The stir welding system of claim 10, wherein the tungsten-based member comprises an arcuate surface opposite from the welding work surface, wherein the welding work surface is generally flat.

17. A stir welding system, comprising:
a backing plate comprising liquid passages and gas passages, and further comprising a cavity; and
a tungsten-based member disposed along the backing plate and received by the cavity, wherein the tungsten-based member defines a generally flush welding work surface including both the backing plate and the member, and wherein the member comprises curved grooves configured to secure the member to the backing plate.

18. The stir welding system of claim 17, wherein the tungsten-based member comprises an arcuate surface opposite from the welding work surface, wherein the welding work surface is generally flat.

19. The stir welding system of claim 17, wherein the gas passages are configured to flow a shielding gas.

20. The stir welding system of claim 17, comprising a pin tool movable by a drive to create friction along one or more workpieces disposed on the welding work surface, wherein the frictional heating and mechanical stirring is configured to create a stir weld along the one or more workpieces.

21. The stir welding system of claim 17, wherein the liquid passages and gas passages are configured to cool or heat the tungsten-based member and one or more workpieces.

* * * * *